United States Patent
Choltco-Devlin et al.

(10) Patent No.: US 11,377,164 B2
(45) Date of Patent: *Jul. 5, 2022

(54) SEAT POST HEAD ASSEMBLY

(71) Applicant: Fox Factory, Inc., Duluth, GA (US)

(72) Inventors: Evan Michael Choltco-Devlin, North Vancouver (CA); David Robert Edwards, Vancouver (CA)

(73) Assignee: Fox Factory, Inc., Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/022,489

(22) Filed: Sep. 16, 2020

(65) Prior Publication Data

US 2021/0061386 A1 Mar. 4, 2021

Related U.S. Application Data

(63) Continuation of application No. 15/938,941, filed on Mar. 28, 2018, now Pat. No. 10,780,933.

(60) Provisional application No. 62/508,649, filed on May 19, 2017.

(51) Int. Cl.
*B62J 1/08* (2006.01)
*B62J 1/04* (2006.01)

(52) U.S. Cl.
CPC .. *B62J 1/08* (2013.01); *B62J 1/04* (2013.01)

(58) Field of Classification Search
CPC ........... B62J 1/08; B62J 1/04; B62J 2001/085
USPC ....................................... 297/215.13–215.15
See application file for complete search history.

(56) References Cited

U.S. PATENT DOCUMENTS

| 4,180,345 | A | 12/1979 | Routens |
| 4,983,063 | A | 1/1991 | Phillips |
| 5,466,042 | A | 11/1995 | Herman |
| 5,664,829 | A | 9/1997 | Thomson et al. |
| 6,702,376 | B1 | 3/2004 | Shen |
| 8,066,295 | B1 | 11/2011 | Cusack et al. |
| 9,550,538 | B2 | 1/2017 | Henderson et al. |
| 10,780,933 | B2 * | 9/2020 | Choltco-Devlin ......... B62J 1/08 |
| 2010/0199481 | A1 | 8/2010 | Petrie et al. |
| 2013/0113242 | A1 | 5/2013 | Connors |
| 2014/0091603 | A1 | 4/2014 | Monaco |
| 2015/0034779 | A1 | 2/2015 | Mcandrews et al. |
| 2016/0023702 | A1 | 1/2016 | Lin |
| 2016/0176463 | A1 | 6/2016 | Mcpherson et al. |
| 2018/0186419 | A1 | 7/2018 | Shipman et al. |
| 2018/0334210 | A1 | 11/2018 | Choltco-Devlin et al. |
| 2018/0334212 | A1 | 11/2018 | Bowers et al. |
| 2019/0016402 | A1 | 1/2019 | Huang |

* cited by examiner

*Primary Examiner* — Mark R Wendell

(57) ABSTRACT

A seat post head assembly is disclosed. The assembly includes a housing coupled to a seat post, the housing including a cylindrical bore, and a first and second threaded chamber. A rotatable core is inserted into and rotates within the cylindrical bore, the rotatable core including a seat rail clamp assembly to fixedly clamp a set of seat rails and provide independent adjustment of a fore-aft location of the seat without affecting a pitch of the seat. The assembly additionally includes a first threaded member that threads into the first threaded chamber, contacts the rotatable core, and adjusts the pitch of the seat without affecting the fore-aft location of the seat. The assembly also includes a second threaded member that threads into the second threaded chamber, contacts a different portion of the rotatable core, and provides a physical hard stop against a change in the pitch.

17 Claims, 9 Drawing Sheets

SEAT POST HEAD ASSEMBLY

CROSS-REFERENCE TO RELATED APPLICATIONS

This application is a Continuation of and claims benefit of U.S. patent application Ser. No. 15/938,941, filed Mar. 28, 2018, entitled "SEAT POST HEAD ASSEMBLY" by Evan Michael Choltco-Devlin et al., assigned to the assignee of the present application, which is herein incorporated by reference in its entirety.

The application with Ser. No. 15/938,941 claims benefit of U.S. Provisional Patent Application Ser. No. 62/508,649, filed May 19, 2017, entitled "SEAT COUPLING AND ADJUSTMENT SYSTEM" by Evan Michael Choltco-Devlin et al., assigned to the assignee of the present application, which is herein incorporated by reference in its entirety.

FIELD OF THE INVENTION

Embodiments of the invention generally relate to systems for adjusting a location and an orientation of a seat coupled to a seat head assembly.

BACKGROUND

Seat and seat orientation is an important part of a vehicle (such as a bicycle, unicycle, tricycle, and the like) setup. If the seat is too far forward, a rider sitting on the seat will feel crowded, or unstable. Similarly, if the seat is too far back, the rider on the seat would feel uncomfortable based on the reach requirement. Moreover, if the seat is pitched too far forward (or too far backward) it will cause undue discomfort for the rider. Additionally, what would be considered a good set-up for one rider would likely feel uncomfortable for another rider. As such, there are no universal seat geometry settings, instead the seat settings are user specific. Because the settings are user specific, there are a number of different seat post head assemblies.

BRIEF DESCRIPTION OF THE DRAWINGS

Aspects of the present invention are illustrated by way of example, and not by way of limitation, in the accompanying drawings, wherein.

Figure 1A:
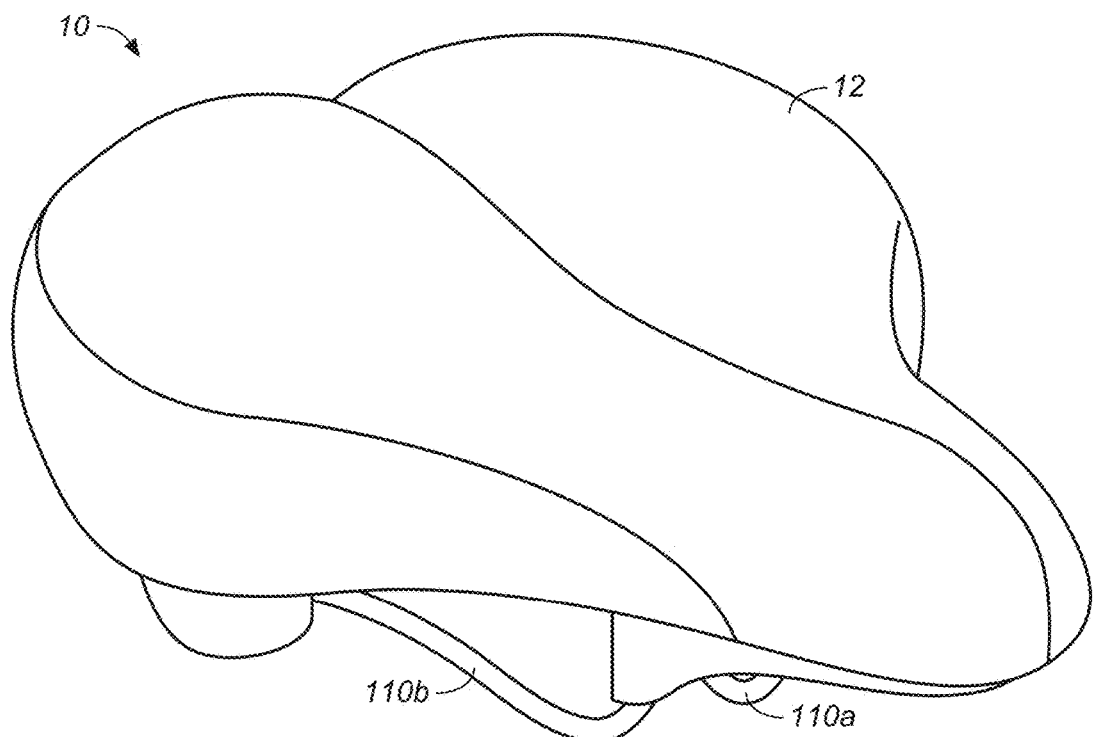
FIG. 1A is a perspective view of a seat, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

Terminology

In the following discussion, a number of terms and directional language is utilized. Although the technology described herein is useful on a number of vehicles that have an adjustable seat, a bicycle will be used to provide guidance for the terms and directional language.

The term "seat tube" refers to a portion of a frame to which a seat post is attached.

In general, a bicycle has a front (e.g., the general location of the handlebars and the front wheel) and a rear (e.g., the general location of the rear wheel). For purposes of the discussion the front and rear of the bicycle can be considered to be in a first plane. A second plane that is perpendicular to the first plane would be similar to an exemplary flat plane of the ground upon which the bicycle is ridden.

For purposes of the following discussion, movement in a fore or forward direction is movement toward the front of the bicycle and movement in an aft or rearward direction is movement toward the rear of the bicycle, e.g., movement that is in the same first plane. Further, the fore-aft movement of the seat refers to the movement of the seat with respect to a central axis of the seat tube of the bicycle.

For example, if the center of the seat were initially located directly above the central axis of the seat tube, a fore movement of the seat would move the center of the seat somewhat in front of the central axis of the seat tube. Conversely, an aft movement of the seat would move the center of the seat into a position somewhat behind the central axis of the seat tube. In the present discussion, a fore-aft movement of the seat does not modify a pitch of the seat.

In the following discussion, the pitch of the seat refers to the exemplary horizontal plane drawn from the front of the seat to the back of the seat. For example, if the seat is mounted to the seat post head with a zero degree pitch, the front of the seat and the back of the seat would rudimentarily be in a horizontal plane having a parallel orientation with the exemplary flat plane of the ground as described above.

An upward pitch of the seat would occur when the seat rotates about the seat post head such that the front of the seat is higher (e.g., further from the ground plane) while the rear of the seat is lower (e.g., closer to the ground plane). In an upward pitch scenario, the seat plane would no longer be parallel with the flat plane of the ground but would instead intersect the ground plane at some location aft of the seat post head.

In contrast, a downward pitch of the seat would occur when the seat rotates about the seat post head such that the front of the seat is lower (e.g., closer to the ground plane) while the rear of the seat is higher (e.g., further from the ground plane). In a downward pitch scenario, the seat plane would no longer be parallel with the flat plane of the ground but would instead intersect the ground plane at some location forward of the seat post head.

In the present discussion, a seat pitch adjustment does not modify the fore-aft position of the seat.

Overview

Seat posts are adjustable for fore/aft position and pitch adjustment of the seat. The adjustments can be for personal preferences, different bike geometries, different user geometries, different terrain, different performance characteristics, and the like. For example, a tall rider would prefer a further aft seat position than a shorter rider on the same bike. Similarly, a rider would likely prefer a first seat pitch when riding a bike on a road and a second seat pitch when riding the same bike on a BMX track.

The following discussion provides a novel solution for a seat post head that includes the ability to allow "infinite" (un-indexed), adjustment of a seat's fore-aft position while also allowing "infinite" (un-indexed), adjustment of the seat's pitch, independent of one another. Moreover, the solution provides a mechanical stop for pitch adjustment such that accidental seat pitch movement is significantly reduced or even removed in normal and higher-than-normal seat loading scenarios.

In one embodiment, the seat post head assembly includes a housing on top of a seat post, the housing having a cylindrical bore therethrough, a first threaded chamber, and a second threaded chamber. In one embodiment, a rotatable core is inserted into the cylindrical bore and a single bolt/nut runs parallel to the main cylindrical bore axis though the rotatable core to clamp the seat rail for fore-aft position settings and adjustments only. For independent adjustment of seat pitch, the rotatable core can rotate within the cylindrical bore. In one embodiment, the pitch is adjusted by loosening/tightening threaded fasteners passing through the first and second threaded chamber transverse to the main cylindrical bore axis. In one embodiment, the fasteners are inserted in nominally the same direction, but act on opposite tangencies of the rotatable core. In so doing, the counteracting fasteners can cause the rotatable core to displace or partially expand in diameter which provides stability and accommodation of manufacturing and assembly tolerances to eliminate play. Further, the counteracting fasteners will prevent lateral movement of the rotatable core within the cylindrical bore.

In another embodiment, the fasteners are inserted in any orientation that provides opposite loading of the fasteners with respect to the rotatable core within the cylindrical bore. Moreover, the use of two fasteners providing opposite loading to the rotatable core help prevent unwanted pitch movement under normal and high load conditions.

In one embodiment, the seat rails are clamped by bolts threaded directly to the rotatable core. Moreover, as described herein, the rail clamp is removed from the rotatable core for reversal and offset change. In another embodiment, the inner clamp halves are integral to the rotatable core instead of separate components.

Furthermore, in one embodiment, the disclosed features induce a flex/expansion of the rotatable core within the cylindrical bore of the housing to fill space (or increase the friction) between the outer wall of the rotatable core and the inner wall of the cylindrical bore created by manufacturing and/or assembly tolerances. This flex/expansion reduces or even eliminates play and/or rattle between the rotatable core and the cylindrical bore in the seat post head assembly.

Thus, the system allows for independent adjustment of a fore-aft position of the seat without affecting a pitch of the seat and also allows for independent adjustment of the pitch of the seat without affecting the fore-aft position of the seat. Moreover, the pitch position of the seat is backed by the physical hard stop, of both pitch fasteners acting together to provide increased support against pitch slip of the seat in both the upward and downward direction even when a hard force is applied to the seat.

Discussion

Figure 1B:
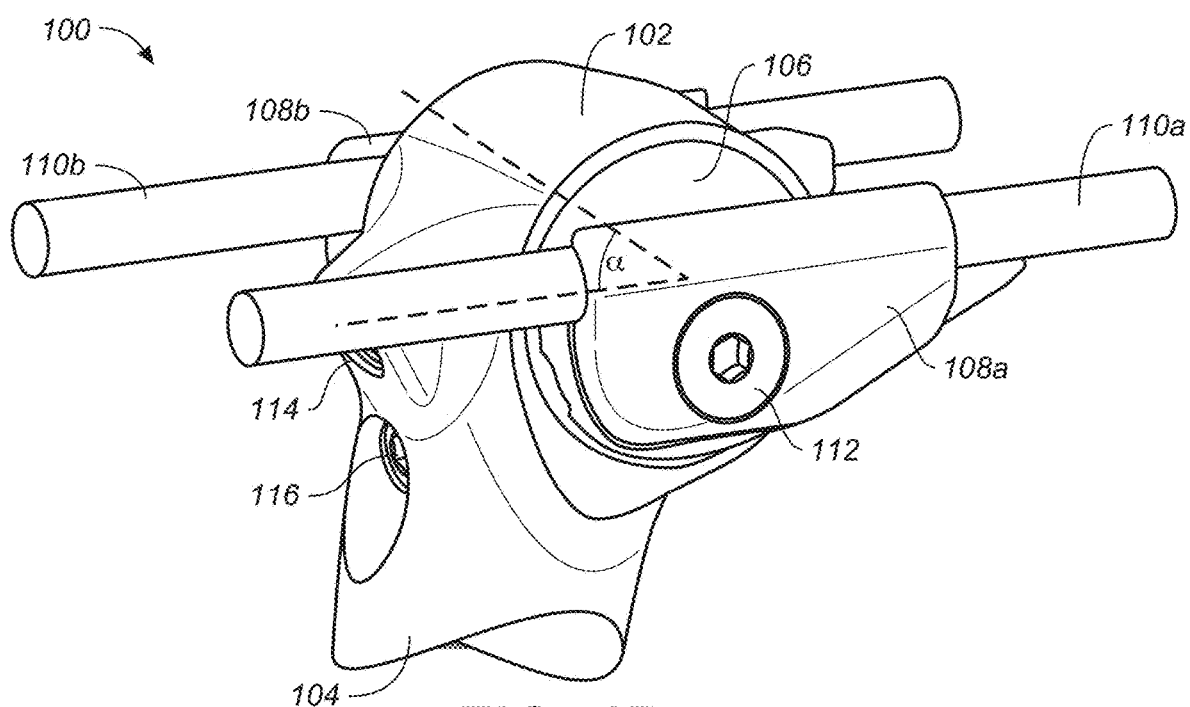
FIG. 1B is a perspective view of an exemplary system for coupling the seat of FIG. 1A to a seat tube of a vehicle, in accordance with an embodiment.
Figure 2:
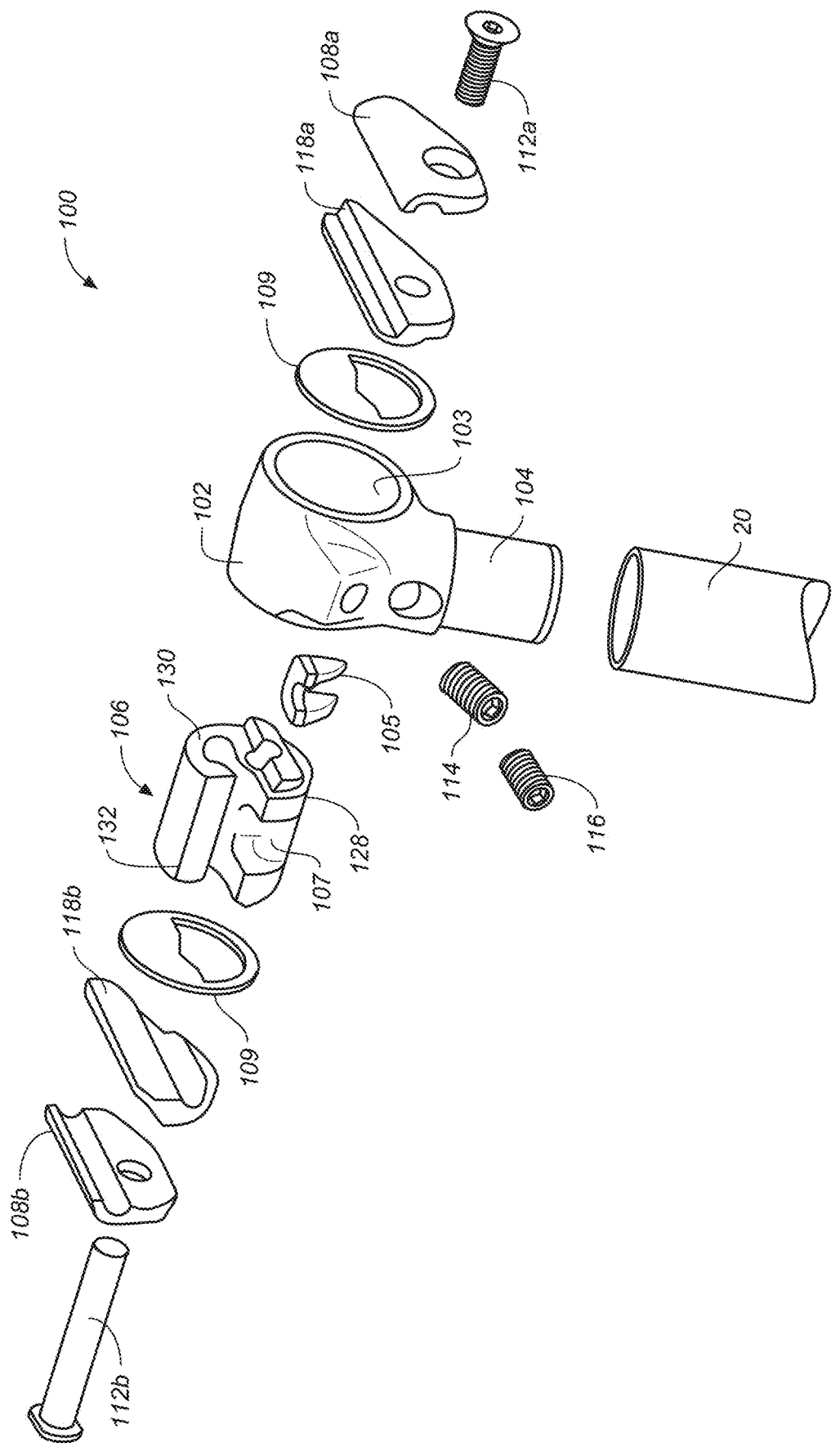
FIG. 2 is an exploded perspective view of the system of FIG. 1B, in accordance with an embodiment.

FIG. 1A illustrates an exemplary seat 10 including a platform 12 for sitting and a first rail 110a and a second rail 110b (collectively rails 110). The seat 10 is for a bicycle or another vehicle. Referring now also to FIG. 1B, an exemplary system 100 for coupling and adjusting a position of the seat 10 relative to the vehicle is shown. The system 100 includes a housing 102 which is barrel-shaped and a seat post 104 configured for coupling with the vehicle. The seat post 104 is, for example, configured for coupling with a seat tube 20 as shown in FIG. 2. The system 100 further houses a rotatable core 106, a first outer seat rail clamping member 108a and a second outer seat rail clamping member 108b (collectively outer clamping members 108), clamping adjustment members 112 (to adjust and maintain fore-aft seat position), and first threaded member 114 and second threaded member 116 (to adjust and maintain seat pitch). Together, the system 100 enables independent positioning of an angle α of the seat platform 12 relative to the seat post 104 and a seat fore-aft position relative to the vehicle.

In one embodiment, seat post 104 and housing 102 are formed as a single component. In another embodiment, seat post 104 and housing 102 consist of two or more distinct and/or different components. Further, seat post 104 and housing 102 are formed of the same materials, formed of different materials, etc. The materials include a group of materials such as, but not limited to, a metal, a composite, a combination of both metal and composite parts within each part, and the like. The metal options include, but are not limited to, steel, aluminum, titanium, and the like. The composite materials include carbon based composites, plastics, and the like.

For example, an aluminum housing 102 and an aluminum seat post 104, a titanium housing 102 and a carbon seat post 104, a carbon housing 102 and a titanium seat post 104, a carbon housing 102 and a steel seat post 104, etc. Similarly, there can be other materials utilized such as carbon/metal mix (amalgamation, etc.) For example, housing 102 consist of a carbon body with metal inserts for the openings, etc.

FIG. 2 is an exploded view of the system 100 of FIG. 1B. The housing 102 includes a cylindrical bore 103 for receiving the rotatable core 106. In one embodiment, the rotatable core 106 has a cylindrical shape. In one embodiment, the rotatable core 106 has an elongated cylindrical shape. The cylindrical bore 103 is extended orthogonally relative to the seat post 104 or seat tube 20. The rotatable core 106 can freely rotate within the cylindrical bore 103. The rotatable core 106 includes a substantially cylindrical profile with an opening or passageway through the axial center. Along a peripheral wall of the rotatable core 106, a centering member 105 sits within a recess 107 and cooperate with the first threaded member 114 to keep the rotatable core 106 from axial movement along a first axis 222 (shown in FIG. 3), about which the rotatable core 106 rotates. A pair of end plates 109 serves to cap off the assembled core and housing 102 to prevent intrusion of dirt and debris.

Figure 3:
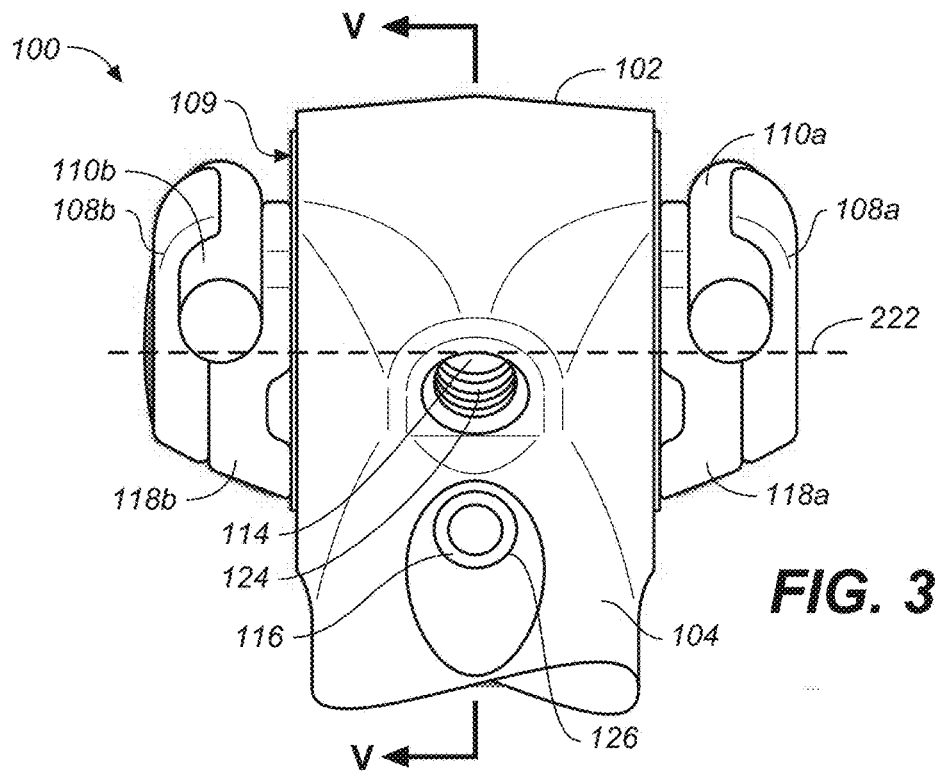
FIG. 3 front side view of a housing of the system of FIG. 1B, in accordance with an embodiment.

Continuing now also with FIG. 3, additional features of the system 100 include first inner seat rail clamp 118a and second inner seat rail clamp 118b (collectively inner clamping members 118) for securing the rails 110 of the seat 10. The outer clamping members 108 are adjusted to clamp down on the rails 110 and secure the rails 110 in a desired position. Clamping adjustment members 112 extend through openings in the outer clamping members 108. The clamping adjustment members 112 include an adjustable length and extend through a first opening 122 (first opening 122 is shown occupied by clamping adjustment members 112 in FIGS. 6A and 6B) extending through the outer clamping members 108, the rotatable core 106, and the end plates 109 along the first axis 222 that is transverse to a plane V.

For example, the clamping adjustment members 112 include a first clamping adjustment member 112a and a second clamping adjustment member 112b as shown in FIG. 2. In one embodiment, the first clamping adjustment member 112a is an exteriorly threaded fastener and the second clamping adjustment member 112b is an interiorly threaded sleeve. As such, a clamp force is generated as the exteriorly threaded fastener is rotated inward into the interiorly threaded sleeve.

The clamping adjustment member 112 is used to simultaneously adjust a clamping force of the outer clamping members 108 to retain the rails 110 in the desired position by pulling the outer clamping members 108 towards the inner clamping members 118 to create a generally axially rigid construct.

In another embodiment (shown in FIG. 12), rotatable core 106 includes an internally threaded inner diameter 1205 therein while both first clamping adjustment member 112a and second clamping adjustment member 112b are exteriorly threaded fasteners. Thus, each of the first clamping adjustment member 112a and the second clamping adjustment member 112b are individually tightened to provide the clamping force of the outer clamping members 108 while the rotational aspects of rotatable core 106 remain encumbered.

Figure 5A:
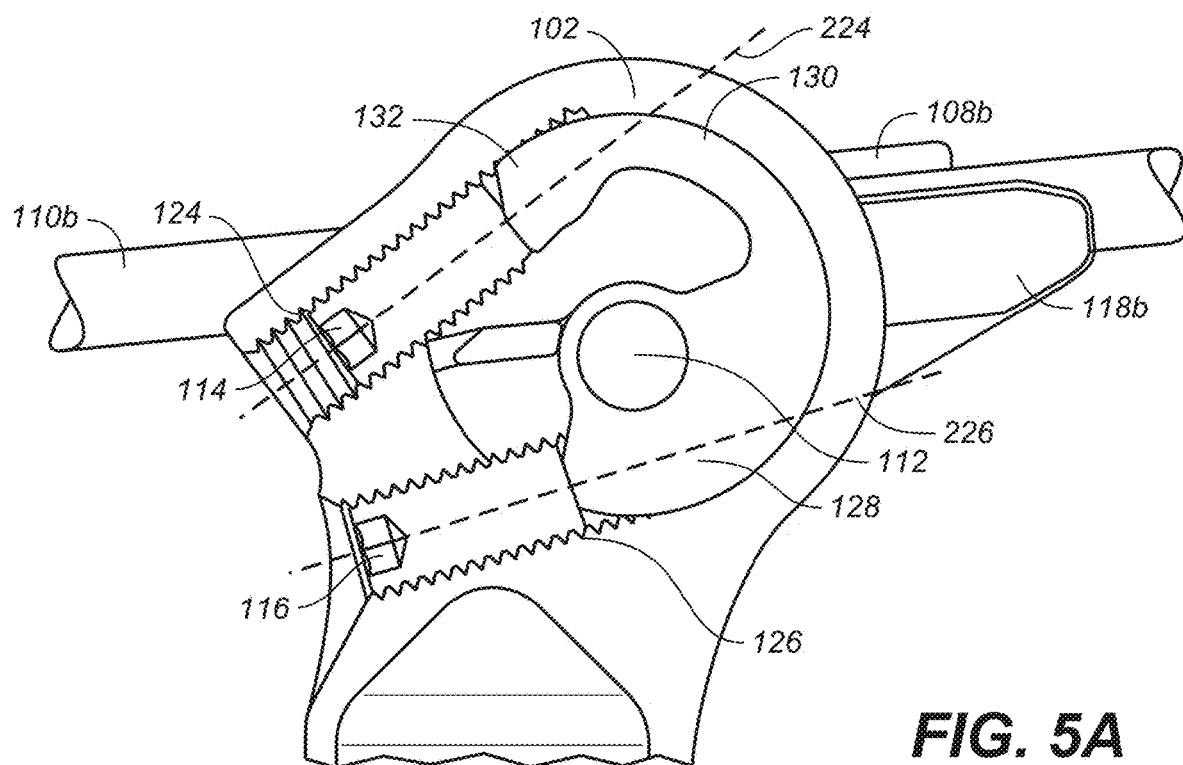
FIGS. 5A and 5B are cross-sectional views of the housing looking into plane V of FIG. 3, in accordance with an embodiment.
Figure 5B:
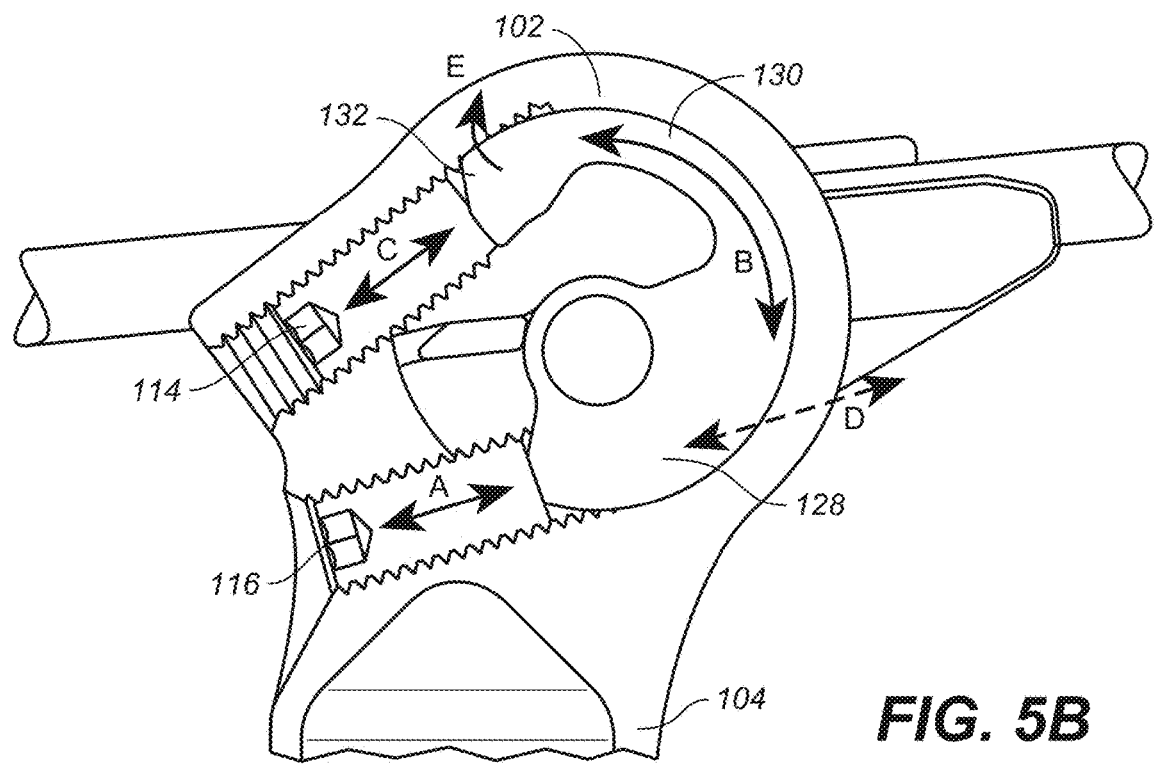

Looking now also to FIGS. 5A and 5B, additional features of the system 100 are more clearly shown in cross-sectional views looking into the plane V of FIG. 3. The first threaded member 114 and second threaded member 116 are disposed within a first threaded chamber 124 and a second threaded chamber 126. The first threaded chamber 124 and the second threaded chamber 126 pass though one side of the housing 102 and into the cylindrical bore 103 (e.g., first threaded chamber 124 and the second threaded chamber 126 intersect the cylindrical bore 103). The first threaded member 114 and/or second threaded member 116 include bolts or screws that extend through the first threaded chamber 124 and second threaded chamber 126 to engage features within the housing 102 that adjust and retain the seat angle α. Rotatable core 106 further includes a base portion 128, a displaceable portion 130, and an end portion 132 on a terminal end of the displaceable portion 130. Displaceable portion 130 includes an elastically displaceable material.

The first threaded member 114 extends through the first threaded chamber 124 and into an interior portion of the housing 102. The first threaded member 114 is rotated by applying force to a drive end to advance along a second axis 224 into and out of the interior portion. The first threaded member 114 includes a second end that engages the end portion 132 of the rotatable core 106.

The second threaded member 116 extends through second threaded chamber 126 and into the interior portion of the housing 102. The second threaded member 116 is rotated by applying force to a drive end to advance along a third axis 226 into and out of the interior portion. The second threaded member 116 includes a second end that engages the base portion 128 of the rotatable core 106. The first axis 222 is transverse to both the second axis 224 and the third axis 226. The second axis 224 and the third axis 226 is tangential to a rotational path of the rotatable core 106 about the first axis 222. The second axis 224 and third axis 226 is co-linear, parallel, orthogonal, or any other angle necessary to engage the end portion 132 of the rotatable core 106.

Advancing second threaded member 116 inwardly in the direction A to lock a position of the rotatable core 106 from further rotation in the clock-wise direction of arrow B. Advancing the first threaded member 114 inwardly in the direction C to further restrict movement of the rotatable core 106 from further rotation in the counter-clockwise direction of arrow B.

Thus, by moving the first threaded member 114 and the second threaded member 116 into or out of their associated chambers the rotation of rotatable core 106 within cylindrical bore 103 can be adjusted. By adjusting the rotation of rotatable core 106, the pitch of the seat 10 is adjusted. Moreover, since it is the rotation of rotatable core 106 that is adjusted to modify the pitch, it can be adjusted without affecting the fore-aft location of the seat 10. After the pitch is set at the desired angle, the first threaded member 114 and the second threaded member 116 are tightened against rotatable core 106. In so doing, first threaded member 114 and second threaded member 116 will provide a physical hard stop against a change in the pitch of seat 10 in either direction.

In one embodiment, rotatable core 106 has a cylindrical G-shape, e.g., a thinner displaceable portion 130 as shown in FIG. 5A which has material removed to save weight and to provide a relative flex to allow rotatable core 106 to displace into the inside diameter of housing 102 to reduce play. Moreover, as one or both of first threaded member 114 and second threaded member 116 are tightened against rotatable core 106, the entire outside diameter of rotatable core 106 will displace a portion of rotatable core 106 within housing 102 thereby increasing friction, reducing play, and providing a pressure fit, etc., In one embodiment, using the expansion capabilities reduces the need to add any additional bearings, etc.

For example, the first threaded member 114 contacts the first portion of the rotatable core 106 at either a top portion of the cylindrical G-shape opening or a bottom portion of the cylindrical G-shape opening. Similarly, the second threaded member 116 contacts the second portion of the rotatable core 106 at whichever of the top portion of the cylindrical G-shape opening or the bottom portion of the cylindrical G-shape opening is not contacted by the first threaded member 114. The first threaded member 114 and the second threaded member 116 displace an outer diameter (OD) of the rotatable core 106 within the cylindrical bore 103 when they are in contact with the rotatable core 106.

For example, as shown in FIG. 5B, first threaded member 114 covers distance C and is in contact with end portion 132 to establish the pitch. Second threaded member 116 is then advanced inwardly in the direction A until contact is made with base portion 128. At that point, the pitch is set and a hard stop is provided in either direction of pitch rotation by first threaded member 114 and second threaded member 116. If, after making contact with base portion 128, second threaded member 116 is advanced further inward in direction A, second threaded member 116 will cause a small expansion of the base portion 128 in a direction D, substantially parallel to the direction A causing the displaceable portion 130 to displace radially outward from the first axis 222 (of FIG. 3) in the direction E. The displaceable portion 130, thus, allows the rotatable core 106 to displace radially outward to "fill-up" or frictionally engage the cylindrical bore 103, thereby providing better stability, accommodate ease of assembly, and decrease manufacturing tolerances. A similar expansion will occur if first threaded member is moved further inward (tightened) in the C direction, or if both first threaded member 114 and second threaded member 116 are tightened against rotating member 106.

Retracting first threaded member 114 and/or second threaded member 116 allows the displaceable portion 130 to return to its original radius due to the elastic property of the material. Further retracting the first threaded member 114 and/or second threaded member 116 allows the rotatable core 106 to freely rotate in either rotational direction B to provide an infinite" (un-indexed) adjustment capability of the pitch of attached seat 10.

Figure 4:
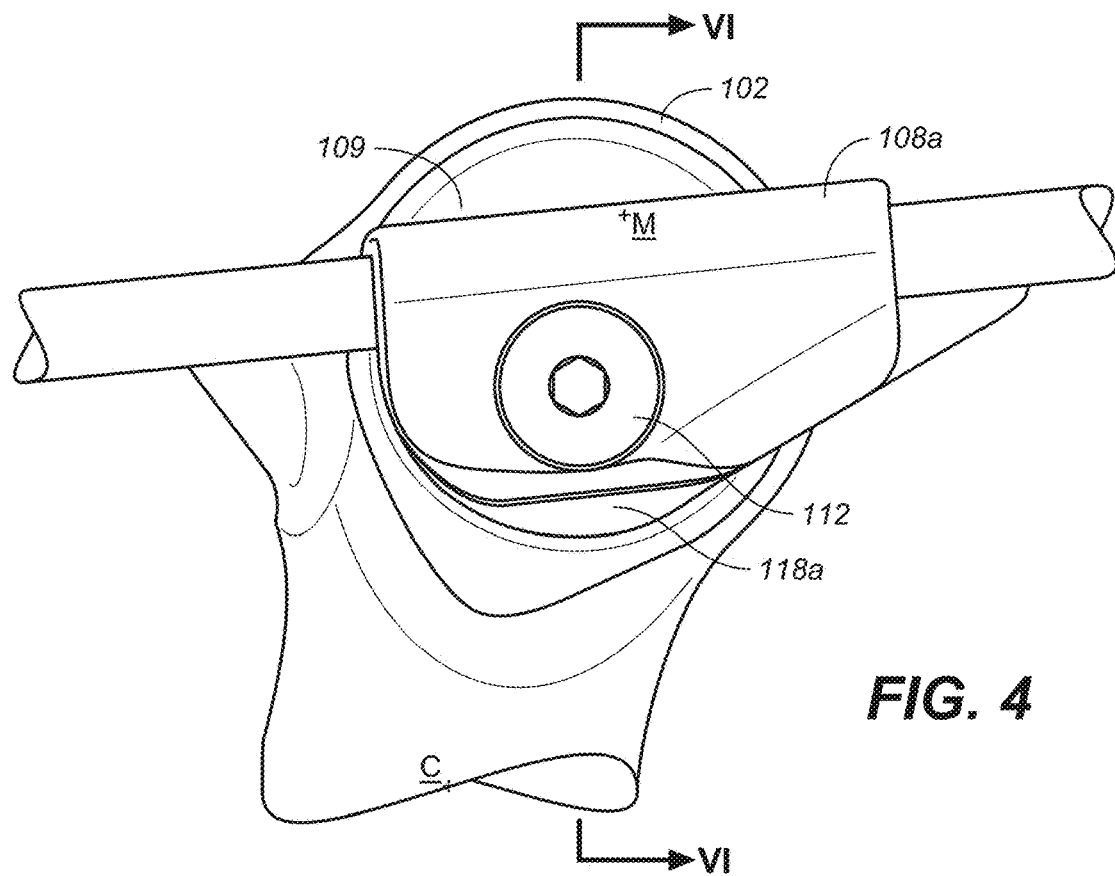
FIG. 4 is left side view of the housing of FIG. 3, in accordance with an embodiment.

FIG. 4 illustrates a side view of the system 100 with a plane VI passing through approximately the center of the housing 102, bisecting clamping adjustment members 112. In FIG. 4, a configuration for the outer clamping members 108 and inner clamping members 118 is shown. In general, the outer clamping members 108 and inner clamping members 118 are arranged to provide a seat post head offset of the seat in an aft direction. The seat post head offset is measured as the total distance from a midpoint M of the outer clamping members 108 to a centerline C of seat tube 20 or seat post 104.

For example, in one embodiment, there is a backward offset of 20 mm from the central axis of the seat post 104 to first inner seat rail clamp 118a and second inner seat rail clamp 118b. That is, there is a 10 mm rearward offset (toward the rear of the bike assembly, e.g., away from the handlebars) between the central axis of seat post 104 (e.g., centerline C of seat tube 20) and a central axis VI of rotatable core 106 and then another 10 mm rearward offset between the central axis VI of rotatable core 106 and the center axis of the rails clamps, (e.g., midpoint M). The sum of the two offsets provides a 20 mm rearward offset from the central axis of seat post 104 (e.g., centerline C) and the central axis of first inner seat rail clamp 118a and second inner seat rail clamp 118b (e.g., midpoint M).

Figure 6A:
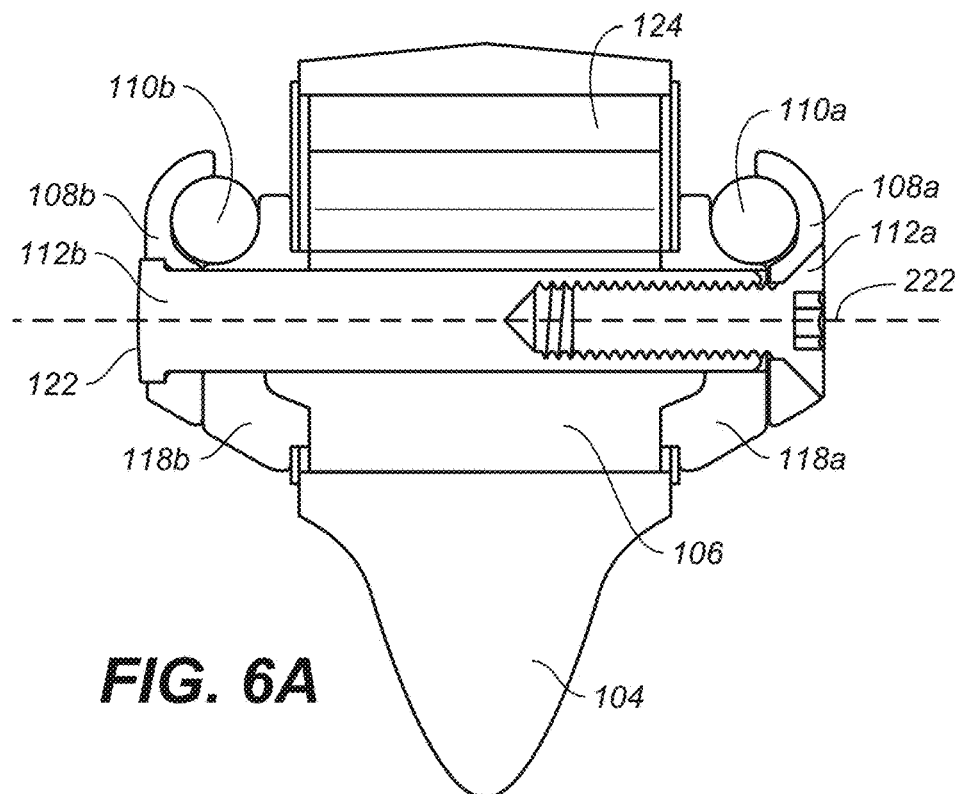
FIGS. 6A and 6B are cross-sectional views of the housing looking into plane VI of FIG. 4, in accordance with an embodiment.
Figure 6B:
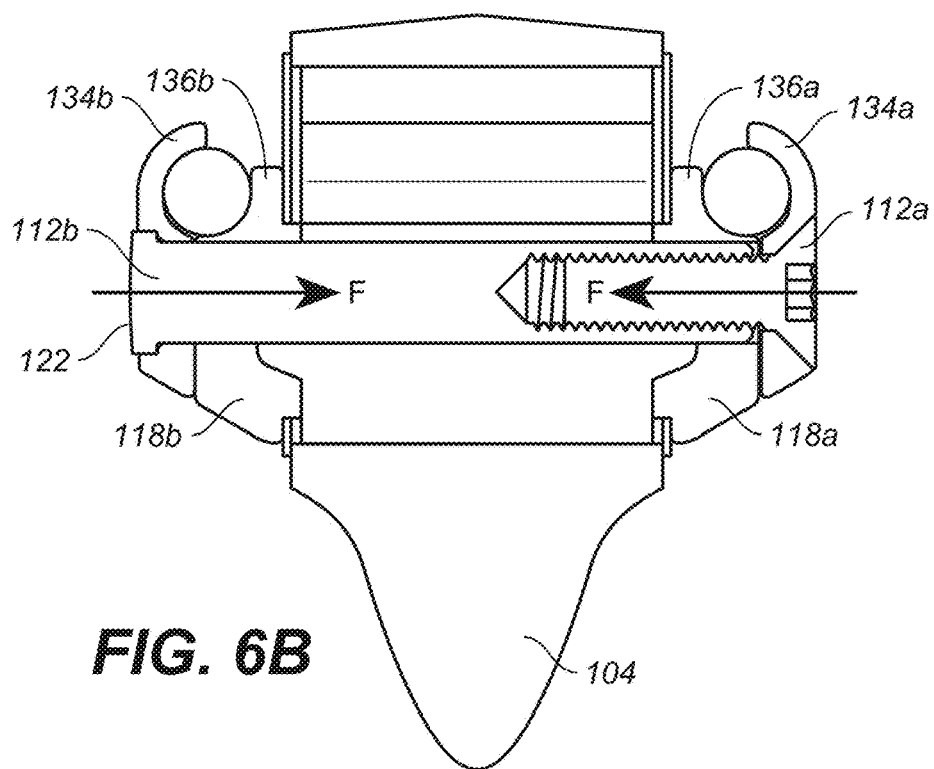

Referring now to FIGS. 6A and 6B, operation of the clamping adjustment members 112 causes the outer clamping members 108 and inner clamping members 118 to secure the rails 110 of the seat. The clamping adjustment members 112 include a first clamping adjustment member 112a and a second clamping adjustment member 112b. The clamping adjustment members 112 extends through outer clamping members 108 and inner clamping members 118 through the first opening 122 (first opening 122 is shown occupied by clamping adjustment members 112 in FIGS. 6A and 6B).

The first opening 122 extends through first outer seat rail clamping member 108a and second outer seat rail clamping member 108b, both first inner seat rail clamp 118a and second inner seat rail clamp 118b, and the rotatable core 106 via an elongated passageway extending along the first axis 222. As the first clamping adjustment member 112a and the second clamping adjustment member 112b are advanced towards one another, a clamping force F is applied when a drive end of the first clamping adjustment member 112a and a flanged end of the second clamping adjustment member 112b act on a ledge near the first opening 122 on first outer seat rail clamping member 108a and second outer seat rail clamping member 108b respectively. Thus, the force F pulls curved portions 134a and 134b of first outer seat rail clamping member 108a and second outer seat rail clamping member 108b towards curved portions 136a and 136b of the first inner seat rail clamp 118a and second inner seat rail clamp 118b respectively to restrict fore-aft motion of rails 110 and thus seat 10.

Figure 9:
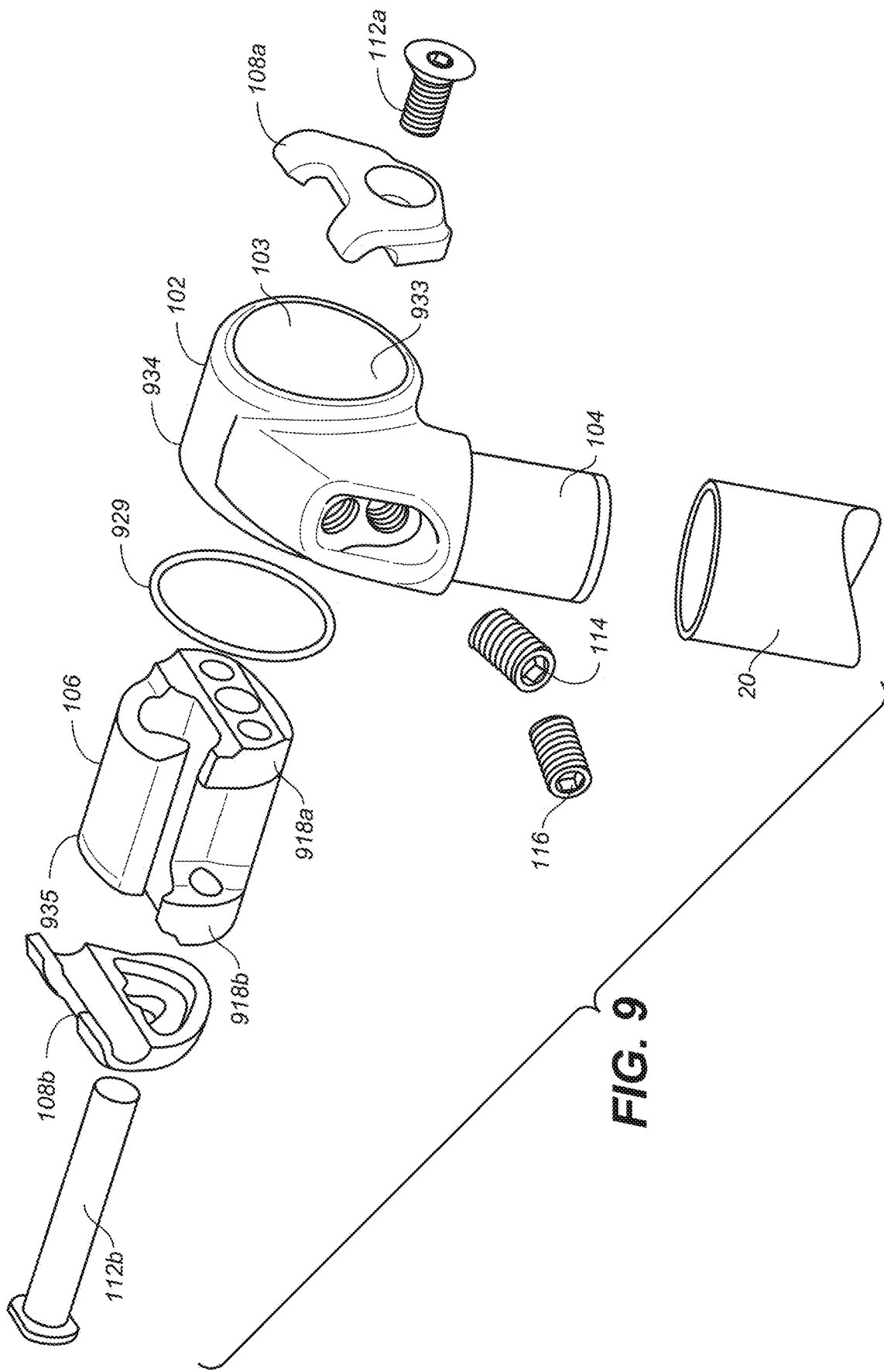
FIG. 9 is an exploded perspective view of a modified system of FIG. 1B, in accordance with an embodiment.

In one embodiment, inner clamping members 118 are separate pieces that attach to rotatable core 106 as shown in FIG. 2. In one embodiment, inner clamping members 118 are integral with the rotatable core 106 as shown in FIG. 9. As described herein, the pitch and the pitch adjustment capabilities of rotatable core 106 are not affected by the clamping force F applied to retain and restrict movement of the rails 110 relative to the system 100.

Figure 7:
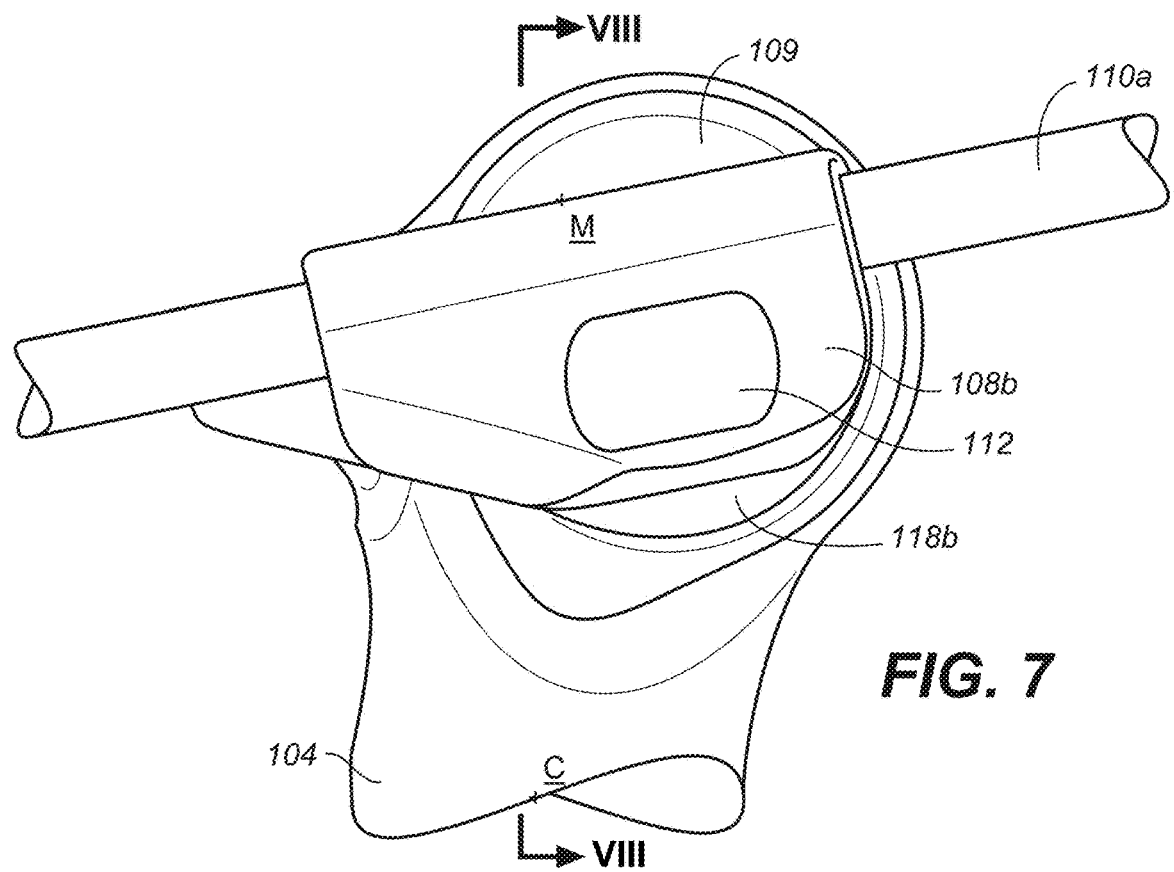
FIG. 7 is a left side view of a housing of another exemplary system for coupling the seat of FIG. 1B to a seat tube of a vehicle, in accordance with an embodiment.

Referring now to FIG. 7, another configuration for the outer clamping members 108 and inner clamping members 118 are shown. In the configuration of FIG. 7, the location of first outer seat rail clamping member 108a and second outer seat rail clamping member 108b and first inner seat rail clamp 118a and second inner seat rail clamp 118b are reversed with respect to the sides of rotatable core 106. By reversing the location of first outer seat rail clamping member 108a and second outer seat rail clamping member 108b and first inner seat rail clamp 118a and second inner seat rail clamp 118b from the left side to the right side, the offset is mostly eliminated. For example, by swapping sides for first outer seat rail clamping member 108a and second outer seat rail clamping member 108b and first inner seat rail clamp 118a and second inner seat rail clamp 118b to opposite sides of rotatable core 106 the offset between the central axis of the seat post 104 (e.g., centerline C) and the central axis of first inner seat rail clamp 118a and second inner seat rail clamp 118b (e.g., midpoint M) is reduced to approximately 0 mm. As such, the centroid of first inner seat rail clamp 118a and second inner seat rail clamp 118b (e.g., midpoint M) would be on the axis of seat post 104 (e.g., centerline C).

That is, since there is a 10 mm rearward (toward the rear of the bike assembly, e.g., away from the handlebars) offset between the central axis of seat post 104 (e.g., centerline C) and the central axis VIII of rotatable core 106. Then, due to the reversal of sides for first inner seat rail clamp 118a and second inner seat rail clamp 118b, there would be a 10 mm forward (toward the handlebars of the bike assembly) offset between the central axis VIII of rotatable core 106 and the center axis of first inner seat rail clamp 118a and second inner seat rail clamp 118b (e.g., midpoint M). The opposing offsets would provide a sum of 0 mm offset between central axis of seat post 104 (e.g., centerline C) and the centroid of first inner seat rail clamp 118a and second inner seat rail clamp 118b (e.g., midpoint M).

Figure 8:
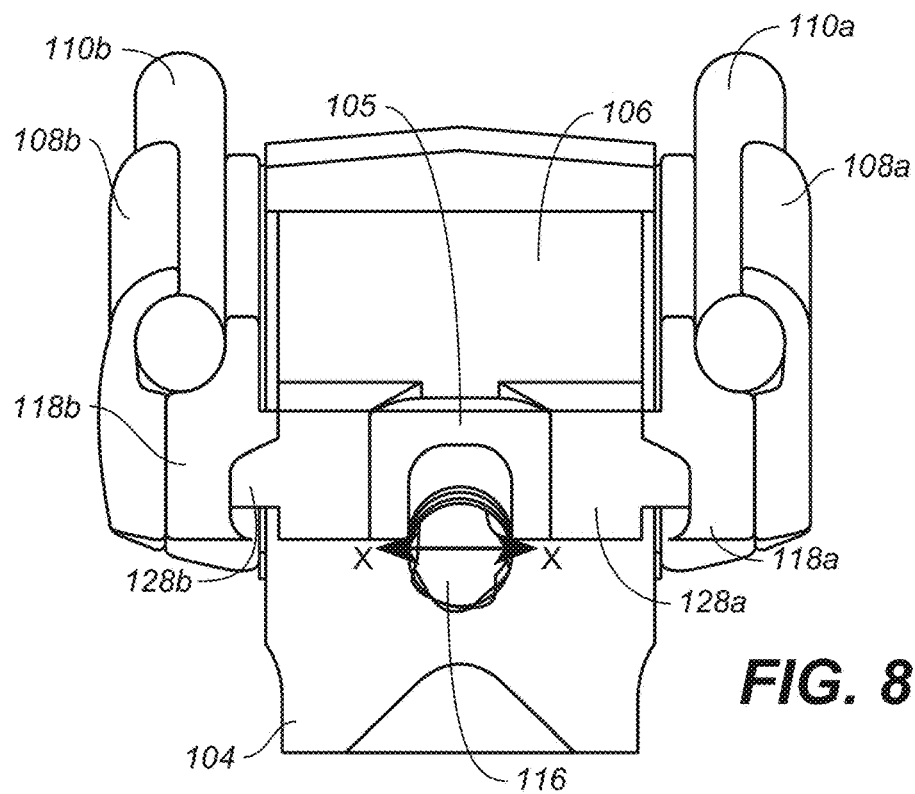
FIG. 8 is a cross-sectional view of the housing looking into plane VIII of FIG. 7, in accordance with an embodiment.

Referring now to FIG. 8 the base portion 128 includes, for example, a pair of tabs 128a and 128b formed by the recess 107 (of FIG. 2). The centering member 105 is seated within the recess 107 and to receive the first threaded member 114 (of FIGS. 5A and 5B). The centering member 105 engages the first threaded member 114 and limits the axial movement of rotatable core 106 in relation to housing 102.

With reference now to FIG. 9, an exploded perspective view of a modified system of FIG. 1B is shown in accordance with an embodiment. In general, the features and components of FIG. 9 are similar to those already described in FIG. 2. As such, and for purposes of clarity, only the differences between the features and components of FIG. 9 and FIG. 2 are provided in the following discussion.

In FIG. 9, the first inner seat rail clamp 118a and second inner seat rail clamp 118b (of FIG. 2) are removed. The features of first inner seat rail clamp 118a are integrated with a first end of rotatable core 106 as indicated by first integrated inner seat rail clamp 918a of rotatable core 106. Similarly, the features of second inner seat rail clamp 118b are integrated with a second end of rotatable core 106 as indicated by second integrated inner seat rail clamp 918b of rotatable core 106. The rails 110 of seat 10 are now clamped directly to rotatable core 106 by first outer seat rail clamping member 108a and second outer seat rail clamping member 108b.

In FIG. 9, the end plates 109 (of FIG. 2) are removed. In one embodiment, an O-ring 929 is utilized to limit axial movement of the rotatable core 106 within the cylindrical bore 103. In one embodiment, a first O-ring groove 934 is in a portion of an inner wall 933 of the cylindrical bore 103 and a second O-ring groove 935 is in a portion of an outer wall of the rotatable core 106. When the rotatable core 106 is inserted into the cylindrical bore 103, O-ring 929 will sit in the first O-ring groove 934 and the second O-ring groove 935 to limit axial movement of the rotatable core 106 within the cylindrical bore 103. Although only one O-ring 929 is shown, more than one O-ring 929 could be utilized.

In one embodiment, O-ring 929 is optional as once the components are assembled the left to right movement of rotatable core 106 within cylindrical bore 103 would be limited.

With the removal of first inner seat rail clamp 118a and second inner seat rail clamp 118b, the embodiment shown in FIG. 9 does not have the ability to be converted from a rear offset configuration (as shown in FIG. 4) to an almost nil offset (as shown in FIG. 7) by switching the rail clamps' side relative to the rotatable core 106. As such, FIGS. 10 and 11 are provided to show two of the plurality of possible seat post head assembly offsets which uses all the same parts as shown in FIG. 9, save the shape of housing 102.

Figure 10:
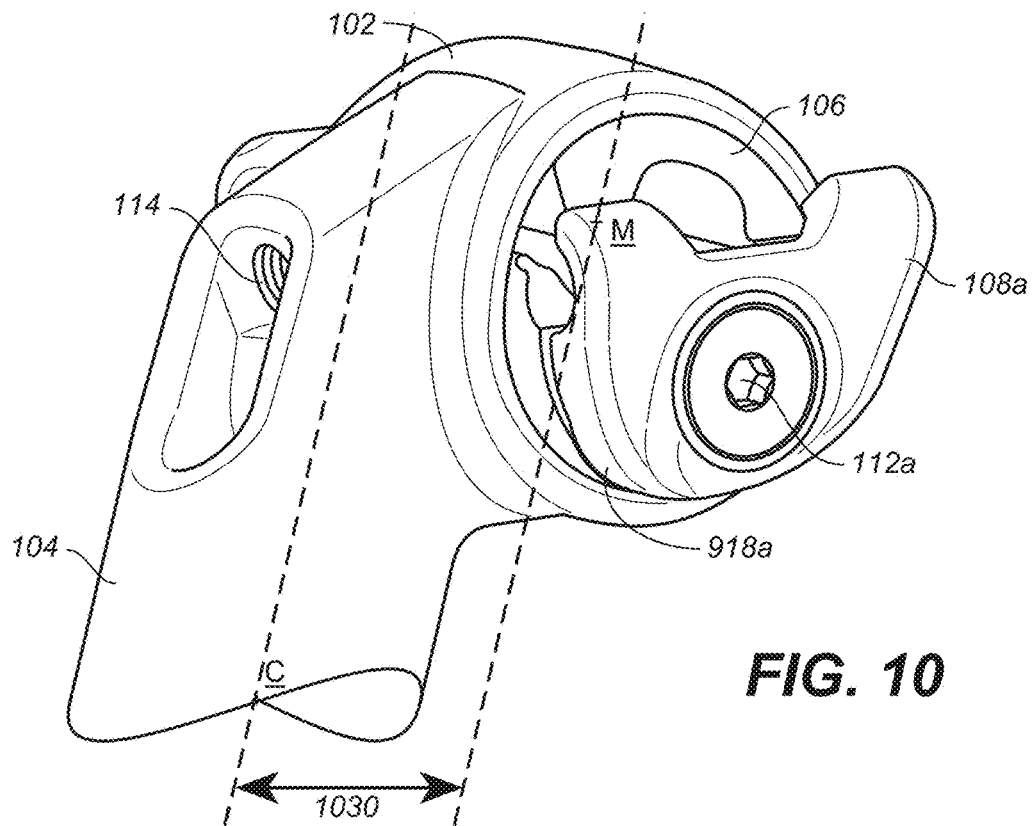
FIG. 10 is a left side view of a rear offset housing of another exemplary system for coupling the seat of FIG. 1B to a seat tube of a vehicle, in accordance with an embodiment.
Figure 11:
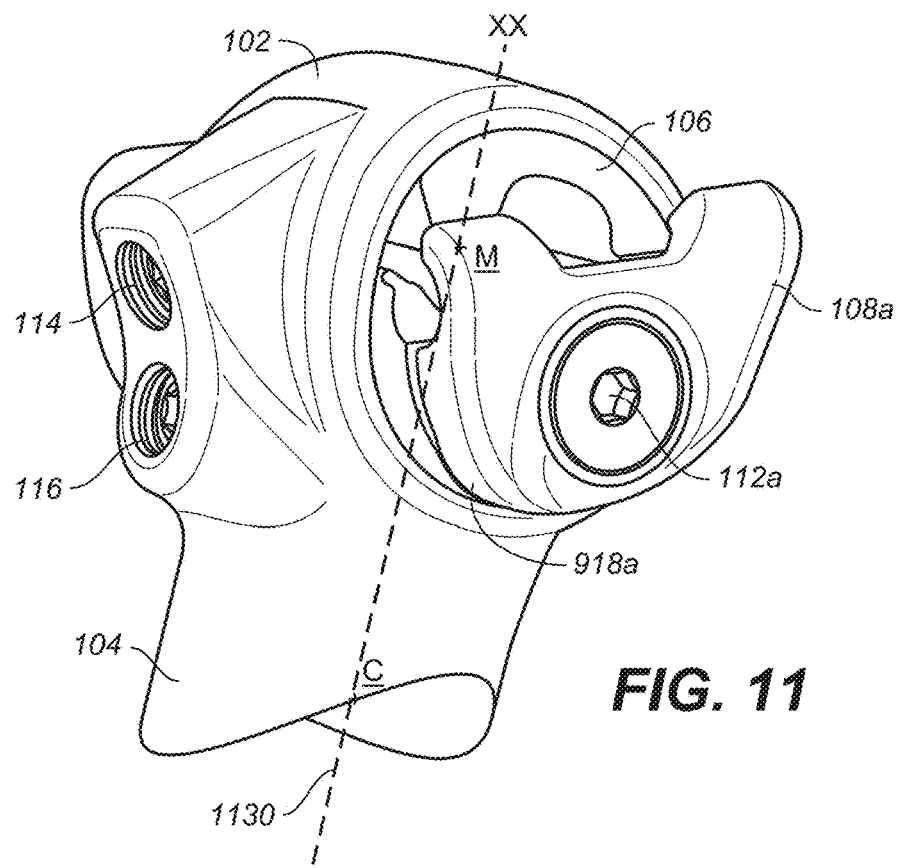
FIG. 11 is a left side view of a no offset housing of another exemplary system for coupling the seat of FIG. 1B to a seat tube of a vehicle, in accordance with an embodiment.

Referring now to FIG. 10, a left side view of a rear offset housing of another exemplary system for coupling the seat of FIG. 1B to a seat tube 20 of a vehicle is shown in accordance with an embodiment. In general, the features and components of FIG. 10 are similar to those already described in FIG. 4. As such, and for purposes of clarity, only the differences between the features and components of FIG. 10 and FIG. 4 are provided in the following discussion.

In FIG. 10, a configuration for housing 102 is shown by offset 1030. For example, cylindrical bore 103 is located in the design of housing 102 such that the midpoint M of the seat rail clamping assembly, consisting of first integrated inner seat rail clamp 918a of rotatable core 106 and first outer seat rail clamping member 108a, is offset from the centerline C of seat post 104 thereby providing an offset 1030.

In general, the offset is established based on the shape of housing 102 at the time of manufacture. In one embodiment, housing 102 having a manufactured offset 1030 of 20 mm to the rear is discussed. However, since the other components remain the same regardless of the offset 1030 designed into housing 102, it should be understood that the offset 1030 measurement for housing 102 can be one of any number of values from a 50 mm or larger forward offset value through a 0 offset value (as shown in the housing 102 of FIG. 11) to a 50 mm rear offset value and possibly even beyond. The size of offset 1030 would be constrained only by the strength and strain characteristics of the material used to make housing 102. Moreover, since the other components of the seat post head assembly 900 remain constant, it is possible that a customer desiring a number of different offsets for different riding set-ups would order at least one additional housing 102 having a different offset and interchange the other components therewith.

With reference now to FIG. 11, a left side view of a no offset housing 102 of another exemplary system for coupling the seat of FIG. 1B to a seat tube 20 of a vehicle is shown in accordance with an embodiment. In general, the features and components of FIG. 11 are similar to those already described in FIG. 7. As such, and for purposes of clarity, only the differences between the features and components of FIG. 11 and FIG. 7 are provided in the following discussion.

In FIG. 11, a configuration for housing 102 is shown having no offset 1130. For example, cylindrical bore 103 is located in the design of housing 102 such that the midpoint M of the seat rail clamping assembly, consisting of first integrated inner seat rail clamp 918a of rotatable core 106 and first outer seat rail clamping member 108a, is aligned with the centerline C of seat post 104 thereby providing a zero offset 1130.

Figure 12:
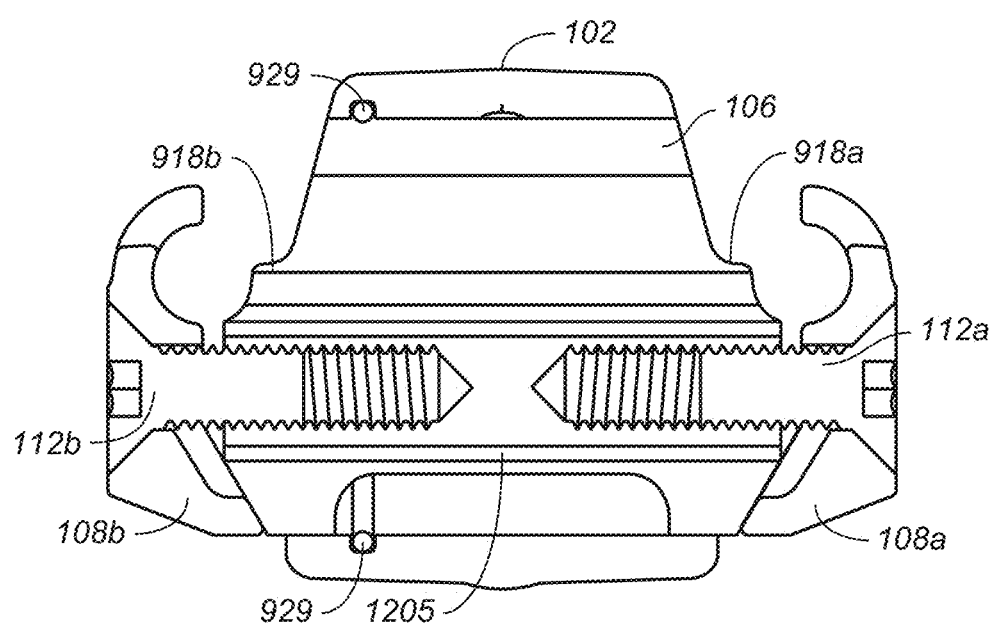
FIG. 12 is a cross-sectional view of the modified housing looking into plane VI of FIG. 4, in accordance with an embodiment.

Referring now to FIG. 12, a cross-sectional view of the modified housing looking into plane XX of FIG. 11 is shown in accordance with an embodiment. As discussed earlier herein, in FIG. 12, includes O-ring 929, housing 102, rotatable core 106 including first integrated inner seat rail clamp 918a, second integrated inner seat rail clamp 918b, and an internally threaded inner diameter 1205 therein. Both first clamping adjustment member 112a and second clamping adjustment member 112b are independently acting exteriorly threaded fasteners. Thus, each of the first clamping adjustment member 112a and the second clamping adjustment member 112b are individually tightened to provide the clamping force of the outer clamping members 108 while the rotational aspects of rotatable core 106 remain encumbered.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments can be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What we claim is:

1. A seat post head assembly comprising:
a seat post, the seat post to couple the seat post head assembly with a seat tube of a vehicle; and
a housing fixedly coupled to the seat post, the housing comprising:
a cylindrical bore therethrough;
a first threaded chamber formed through the housing; and
a second threaded chamber formed through the housing at a location different than the first threaded chamber;
a rotatable core for insertion into the cylindrical bore, the rotatable core being rotatable after insertion into said cylindrical bore, the rotatable core comprising:
a seat rail clamp assembly to fixedly clamp a set of seat rails of a seat and provide independent adjustment of a fore-aft location of the seat without affecting a pitch of the seat;
a first threaded member that threads into the first threaded chamber and contacts a first portion of the rotatable core;
the first threaded member to adjust the pitch of the seat without affecting the fore-aft location of the seat
a second threaded member that threads into the second threaded chamber and contacts a second portion of the rotatable core,
the second threaded member to provide a physical hard stop against a change in the pitch of the seat.

2. The seat post head assembly of claim 1 wherein each of the first threaded chamber and the second threaded chamber pass though one side of the housing and into the cylindrical bore.

3. The seat post head assembly of claim 1 wherein the seat rail clamp assembly comprises:
a first inner seat rail clamp at a first end of the rotatable core; and
a second inner seat rail clamp at a second end of the rotatable core,
the second end opposite the first end;
a first outer seat rail clamping member;
a first clamping adjustment member to fixedly couple the first outer seat rail clamping member with the first inner seat rail clamp to form a first seat rail clamp;
a second outer seat rail clamping member; and
a second clamping adjustment member to fixedly couple the second outer seat rail clamping member with the second inner seat rail clamp to form a second seat rail clamp,
the first seat rail clamp and the second seat rail clamp to fixedly clamp a set of seat rails of a seat and provide independent adjustment of a fore-aft location of the seat without affecting a pitch of the seat.

4. The seat post head assembly of claim 3 wherein the first clamping adjustment member is an exteriorly threaded fastener, the second clamping adjustment member is an interiorly threaded sleeve, and a clamp force is generated as the exteriorly threaded fastener is rotated inward into the interiorly threaded sleeve.

5. The seat post head assembly of claim 3 wherein the first inner seat rail clamp is removably coupled with the first end of the rotatable core and the second inner seat rail clamp is removably coupled with the second end of the rotatable core.

6. The seat post head assembly of claim 1 wherein the rotatable core is a cylindrical G-shape;
the first threaded member contacts the first portion of the rotatable core at either a top portion of the cylindrical G-shape opening or a bottom portion of the cylindrical G-shape opening;
the second threaded member contacts the second portion of the rotatable core at whichever of the top portion of the cylindrical G-shape opening or the bottom portion of the cylindrical G-shape opening is not contacted by the first threaded member; and
the first threaded member and the second threaded member elastically displace an outer diameter (OD) of the rotatable core within the cylindrical bore when they are in contact with the rotatable core.

7. The seat post head assembly of claim 1 further comprising:
at least one first O-ring groove in a portion of an inner wall of the cylindrical bore;
at least one second O-ring groove in a portion of an outer wall of the rotatable core; and
at least one O-ring to sit in the first O-ring groove and the second O-ring groove when the rotatable core is inserted into the cylindrical bore,
the O-ring to limit axial movement of the rotatable core within the cylindrical bore.

8. The seat post head assembly of claim 1 wherein the housing and the seat post are a single component.

9. A seat post head assembly comprising:
a seat post, the seat post to couple with a seat tube of a vehicle;
a housing coupled to the seat post, the housing comprising:
a cylindrical bore therethrough;
a first threaded chamber at a first location of the housing; and
a second threaded chamber at a second location in the housing,
the first threaded chamber and the second threaded chamber oriented to intersect the cylindrical bore;
a rotatable core insertable into said cylindrical bore, the rotatable core comprising:
a first inner seat rail clamp at a first end thereof; and
a second inner seat rail clamp at a second end thereof, the second end opposite the first end;
a first outer seat rail clamping member coupled to the first inner seat rail clamp to form a first seat rail clamp;
a second outer seat rail clamping member coupled to the second inner seat rail clamp to form a second seat rail clamp;
the first seat rail clamp and the second seat rail clamp to fixedly clamp a set of seat rails of a seat and provide independent adjustment of a fore-aft location of the seat without affecting a pitch of the seat;
a first threaded member to thread into the first threaded chamber and contact a first portion of the rotatable core,
the first threaded member to adjust the pitch of the seat without affecting the fore-aft location of the seat; and
a second threaded member to thread into the second threaded chamber and contact a second portion of the rotatable core,
the second threaded member to provide a physical hard stop to reduce pitch slip without affecting the pitch or the fore-aft location of the seat.

10. The seat post head assembly of claim 9 wherein the housing and the seat post comprise two or more distinct components.

11. The seat post head assembly of claim 9 wherein the housing and the seat post are a single component.

12. The seat post head assembly of claim 9 wherein the housing and the seat post are made from a material from a group of materials consisting of: a metal, a composite, and a combination of both metal and composite parts.

13. The seat post head assembly of claim 9 wherein the housing is a different material than the seat post.

14. The seat post head assembly of claim 9 further comprising:
a first clamping adjustment member to couple the first outer seat rail clamping member to the first inner seat rail clamp,
the first clamping adjustment member is an exteriorly threaded fastener; and
a second clamping adjustment member to couple the second outer seat rail clamping member to the second inner seat rail clamp,
the second clamping adjustment member is an interiorly threaded sleeve such that a clamp force is formed as the exteriorly threaded fastener is rotated inward into the interiorly threaded sleeve.

15. The seat post head assembly of claim 9 wherein the rotatable core is a cylindrical G-shape;
the first threaded member contacts the first portion of the rotatable core at either a top portion of the cylindrical G-shape opening or a bottom portion of the cylindrical G-shape opening;
the second threaded member contacts the second portion of the rotatable core at whichever of either the top portion of the cylindrical G-shape opening or the bottom portion of the cylindrical G-shape opening is not contacted by the first threaded member; and
the first threaded member and the second threaded member elastically displace an outer diameter of the rotatable core within the cylindrical bore when they are in contact with the rotatable core.

16. The seat post head assembly of claim 9 further comprising:
a first O-ring groove in a portion of an inner wall of the cylindrical bore;
a second O-ring groove in a portion of an outer wall of the rotatable core; and
an O-ring to sit in the first O-ring groove and the second O-ring groove when the rotatable core is fitted within the cylindrical bore,
the O-ring to limit axial movement of the rotatable core within the cylindrical bore.

17. A seat post head assembly comprising:
a seat post, the seat post to couple with a seat tube of a bicycle;
a housing coupled to the seat post, the housing comprising:
a cylindrical bore therethrough;
a first threaded chamber formed through the housing at a first angle; and
a second threaded chamber formed through the housing at a second angle different than the first angle,
the first threaded chamber and the second threaded chamber oriented to intersect the cylindrical bore;
a rotatable core having an elongated cylindrical shape, the rotatable core inserted into said cylindrical bore and rotatable within the cylindrical bore, the rotatable core comprising:
a first inner seat rail clamp at a first end thereof; and
a second inner seat rail clamp at a second end thereof, the second end opposite the first end;
a first outer seat rail clamping member;
a first clamping adjustment member to fixedly couple the first outer seat rail clamping member with the first inner seat rail clamp to form a first seat rail clamp;
a second outer seat rail clamping member;
a second clamping adjustment member to fixedly couple the second outer seat rail clamping member with the second inner seat rail clamp to form a second seat rail clamp,
the first seat rail clamp and the second seat rail clamp to fixedly clamp a set of seat rails of a seat and provide independent adjustment of a fore-aft location of the seat without affecting a pitch of the seat;
a first threaded member that threads into the first threaded chamber and contacts a first portion of the rotatable core,
the first threaded member to adjust the pitch of the seat without affecting the fore-aft location of the seat; and
a second threaded member that threads into the second threaded chamber and contacts a second portion of the rotatable core,
the second threaded member to provide a physical hard stop against a change in the pitch of the seat as established by the first threaded member.

* * * * *